United States Patent [19]

Kuriyama et al.

[11] Patent Number: 5,734,546
[45] Date of Patent: Mar. 31, 1998

[54] CAPACITOR ELEMENT FOR SOLID ELECTROLYTIC CAPACITOR AND PROCESS FOR MAKING THE SAME

[75] Inventors: Chojiro Kuriyama; Mamoru Yamagami, both of Ukyo-ku, Japan

[73] Assignee: Rohm Co. Ltd., Kyoto, Japan

[21] Appl. No.: 530,757

[22] Filed: Sep. 19, 1995

[30] Foreign Application Priority Data

Sep. 21, 1994 [JP] Japan ................... 6-226939
Feb. 13, 1995 [JP] Japan ................... 7-023812

[51] Int. Cl.$^6$ ................................ H01G 9/00
[52] U.S. Cl. .................. 361/523; 361/528; 361/529; 29/25.03
[58] Field of Search ............... 361/301.1, 301.2, 361/301.3, 303–304, 306.1, 306.2, 307, 308.1, 308.3, 309–311, 508–510, 516–525, 528–534, 538, 540; 29/25.41, 25.42, 25.03, 570, 581–582, 842–844; 228/180.5; 257/780

[56] References Cited

U.S. PATENT DOCUMENTS

| | | | |
|---|---|---|---|
| 3,672,047 | 6/1972 | Sakamoto et al. | 228/180.5 |
| 4,517,626 | 5/1985 | Allen | 361/529 |
| 4,520,430 | 5/1985 | Long et al. | |
| 4,717,066 | 1/1988 | Goldenberg et al. | 228/180.5 |
| 5,295,619 | 3/1994 | Takahasi et al. | 228/180.5 |

*Primary Examiner*—Leo P. Picard
*Assistant Examiner*—Phuong T. Vu
*Attorney, Agent, or Firm*—Michael D. Bednarek; Kilpatrick Stockton LLP

[57] ABSTRACT

A capacitor element for a solid electrolytic capacitor is provided which comprises a chip which is a sintered mass of metal powder, and an anode wire projecting from the chip. The anode wire has a nail head end compressively formed for electrical attachment to a surface of the chip. The attachment of the anode wire may be formed by first forming a ball at a forward end of the anode wire and then pressing the ball end against the chip.

3 Claims, 7 Drawing Sheets

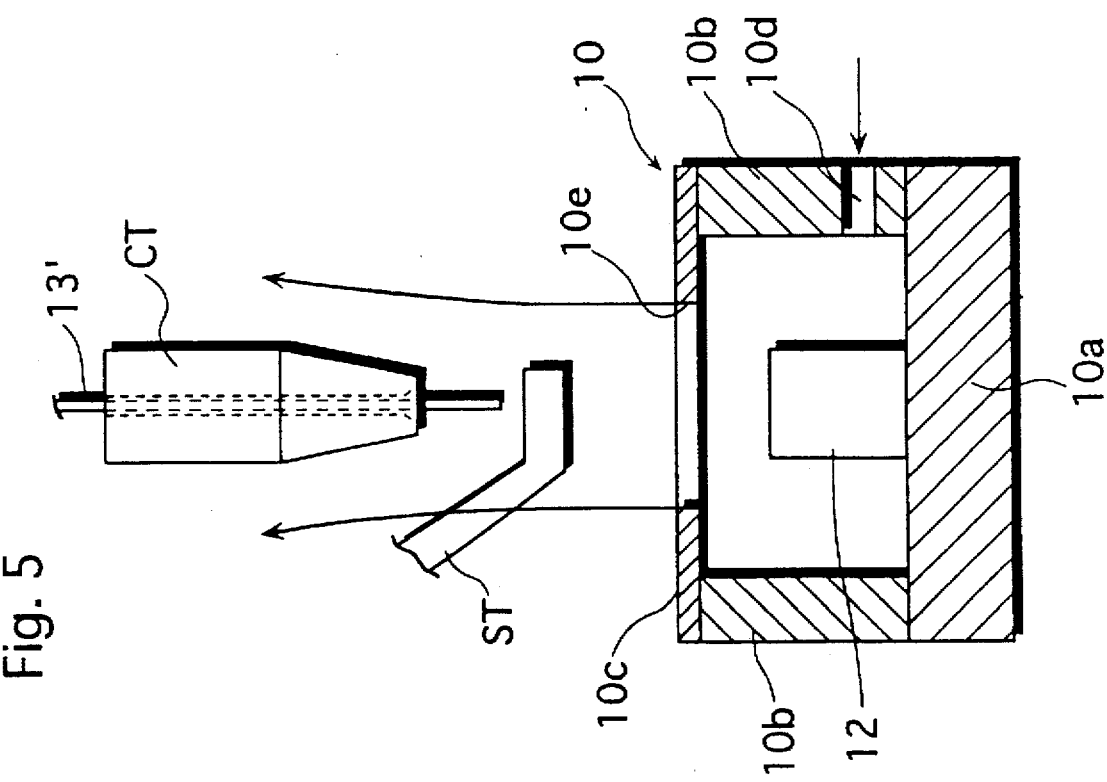
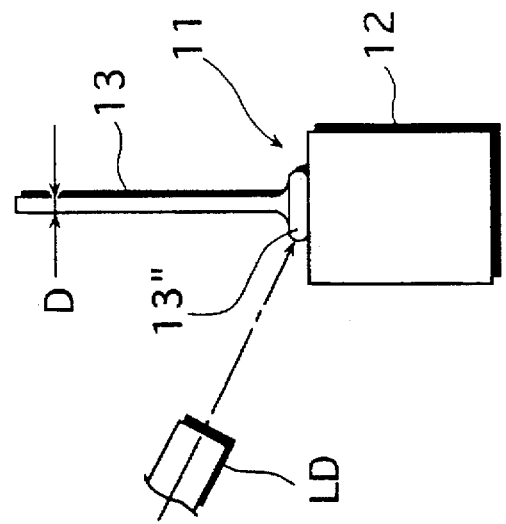

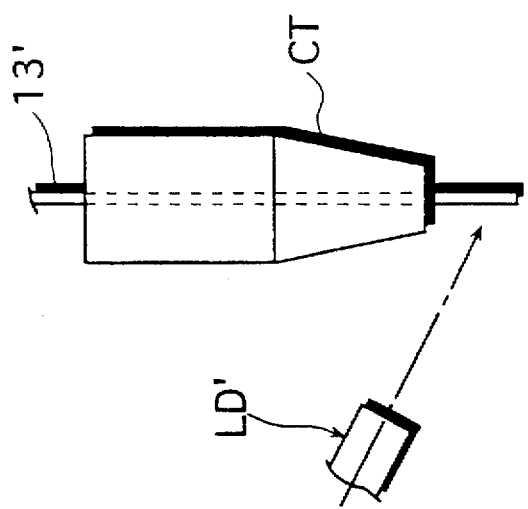
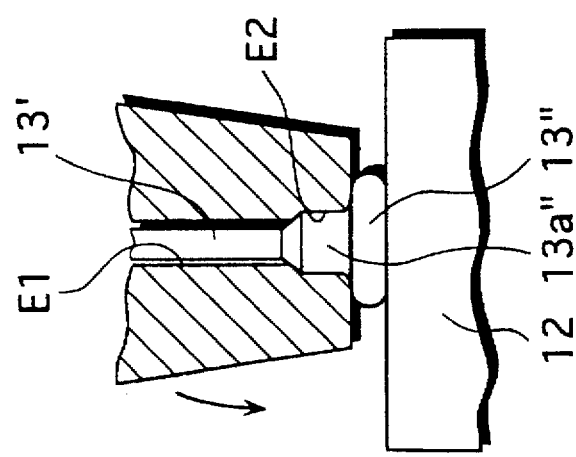
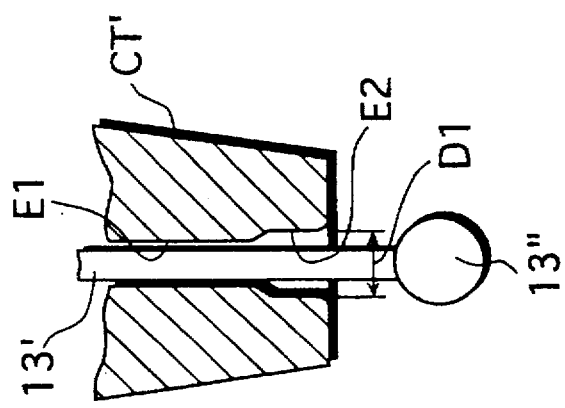

CAPACITOR ELEMENT FOR SOLID ELECTROLYTIC CAPACITOR AND PROCESS FOR MAKING THE SAME

BACKGROUND OF THE INVENTION

1. Field of the Invention

This invention relates to a capacitor element for a solid electrolytic capacitor such as tantalum capacitor or aluminum capacitor. The present invention also relates to a process for making such a capacitor element.

2. Description of the Related Art

Solid electrolytic capacitors such as tantalum capacitor or aluminum capacitor are known to provide a large capacitance while realizing a great size reduction. For this reason, solid electrolytic capacitors are used in various applications.

Typically, a solid electrolytic capacitor incorporates a capacitor element. For convenience of understanding, an example of capacitor element is illustrated in FIGS. 10 and 11 of the accompanying drawings. Specifically, the capacitor element 1 comprises a capacitor chip 2 and an anode wire 3 partially inserted into and partially projecting from the chip 2. The capacitor chip 2 may be a compacted and sintered mass of tantalum powder for example, in which case the anode wire 3 is also made of tantalum.

Before incorporation into a capacitor, the capacitor chip 2 is first immersed entirely in an aqueous solution of phosphoric acid, and a direct current is passed for performing anodic oxidation. As a result, a dielectric layer 4 of tantalum pentoxide for example is formed on the chip 2 (more specifically on the surfaces of chip forming tantalum particles) as well as on an immersed lower part of the anode wire 3, as shown in FIG. 12.

Then, the chip 2 is immersed in an aqueous solution of manganese nitrate, followed by lifting the chip 2 out of the manganese nitrate solution for baking. Such a process step (lowering and raising) is repetitively performed until a solid electrolyte layer 5 of manganese dioxide layer is appropriately formed on the chip 2 over the dielectric layer 4, as shown in FIG. 13.

After forming the solid electrolyte layer 5, the capacitor chip 2 is graphitized and dipped in a metal paste (not shown) of silver or nickel for forming a metal layer 6 which acts as a cathode electrode, as shown in FIG. 14.

When incorporated into a capacitor, the capacitor element 1 is interposed between an anode lead 7 and a cathode lead 8. Specifically, the anode wire 3 of the capacitor element 1 is electrically connected to the anode lead 7 by welding for example, whereas the cathode electrode 6 of the capacitor chip 2 is electrically connected to the cathode lead 8. The capacitor element 1 together with part of the anode and cathode leads 7, 8 is enclosed in a molded resin package 9, and the projecting portions of the anode and cathode leads 7, 8 are bent toward the underside of the resin package 9 for conveniently mounted to a surface of a printed circuit board (not shown).

According to the prior art arrangement shown in FIGS. 10 through 15, the anode wire 3 is partially inserted into the capacitor chip 2. The effective volume of the capacitor chip 2 is reduced as much as the anode wire 3 is inserted in the chip 2, so that the capacitance of the chip 2 per unit volume will correspondingly decrease.

Further, the anode wire 3 is subjected to a compressive force when compacting metal powder (e.g. tantalum powder) into the chip 2. Thus, stresses tend to concentrate at a root portion of the anode wire 3, so that part of the dielectric layer 4 (see FIG. 12) formed on the anode wire 3 near the chip 2 may likely to undergo crack formation which would result in dielectric breakdown.

It is conceivable to eliminate the problem of dielectric breakdown by increasing the diameter D (see FIGS. 10 and 11) of the anode wire 3. However, such a diametrical increase of the anode wire 3 results in a corresponding decrease of the effective volume of the chip 2 to fail in meeting the requirements for a smaller size but a higher capacitance, as already described. Further, a diametrical increase of the anode wire 3 also goes against saving of anode wire material, consequently lead to a higher cost.

SUMMARY OF THE INVENTION

It is, therefore, an object of the present invention to provide a capacitor element for a solid electrolytic capacitor which overcomes the above-described problems.

Another object of the present invention is to provide a process for advantageously making such a capacitor element.

According to one aspect of the present invention, there is provided a capacitor element for a solid electrolytic capacitor comprising:

a chip which is a sintered mass of metal powder; and an anode wire projecting from the chip;

wherein the anode wire has a nail head end compressively formed for electrical attachment to a surface of the chip.

Preferably, the nail head end of the anode wire is formed by compressing a ball end of the anode wire longitudinally of the anode wire. The anode wire may further have a transitional portion adjoining the nail head end and having a diameter which is smaller than a maximum diameter of the nail head end but larger than a normal diameter of the anode wire.

According to another aspect of the present invention, there is provided a process for making a capacitor element for a solid electrolytic capacitor comprising the steps of:

preparing a capacitor chip which is a compacted mass of metal powder;

forming, by thermal melting, a ball at a forward end of an anode wire material which is passed through a capillary tool;

moving the capillary tool toward the chip to press the forward end of the wire material against the chip for attachment thereto; and cutting the wire material at a predetermined distance from the chip.

The formation of the ball at the forward end of the wire material may be preferably performed in an oxygen-free gas atmosphere, thereby facilitating subsequent attachment of the wire material to the chip. Further, the attachment of the forward ball end of the wire material to the chip may also be performed in the same oxygen-free gas atmosphere.

Advantageously, the wire material may be subjected to a reducing pretreatment before attaching the forward ball end of the wire material to the chip. Such a pretreatment serves to remove oxide coating, thereby making subsequent attachment of the wire material to the chip more reliable. Additionally, it is further advantageous if the chip is also subjected to a reducing pretreatment before attaching the forward ball end of the wire material to the chip.

The formation of the ball at the forward end of the wire material may be performed by directing electrical sparks toward the forward end of the wire material. Alternatively, the formation of the ball at the forward end of the wire material may be performed by laser beam irradiation. Further alternatively, the formation of the ball at the forward end of the wire material may be performed by directing a gas flame toward the forward end of the wire material.

The capacitor chip may be sintered after cutting the anode wire material. Alternatively, sintering of the chip may be performed before forming the ball at the forward end of the anode wire material for attachment to the chip.

Other objects, features and advantages of the present invention will be fully understood from the following detailed description given with reference to the accompanying drawings.

BRIEF DESCRIPTION OF THE DRAWINGS

In the accompanying drawings:

FIGS. 1 through 5 are views, in section, showing the successive steps for making a capacitor element according to an embodiment of the present invention;

FIG. 6 is a front view showing the capacitor element made by the process steps shown in FIGS. 1 through 5;

FIGS. 7 and 8 are fragmentary sectional views showing a modified example of capillary tool used for making a capacitor element according to the present invention;

FIG. 9 is a front view showing an modified way of forming a ball at a lower end of an anode wire material;

DETAILED DESCRIPTION OF THE PREFERRED EMBODIMENTS

FIGS. 1 through 4 of the accompanying drawings illustrate the successive steps of making a capacitor element according to an embodiment of the present invention. The capacitor element is made by using a compacted mass 12 (hereafer referred to as "chip") of metal powder such as tantalum powder. Before processing, the metal powder chip 12 is heated at 400°–700° C. for thermal removal of the binder used for compacting.

Figure 1:
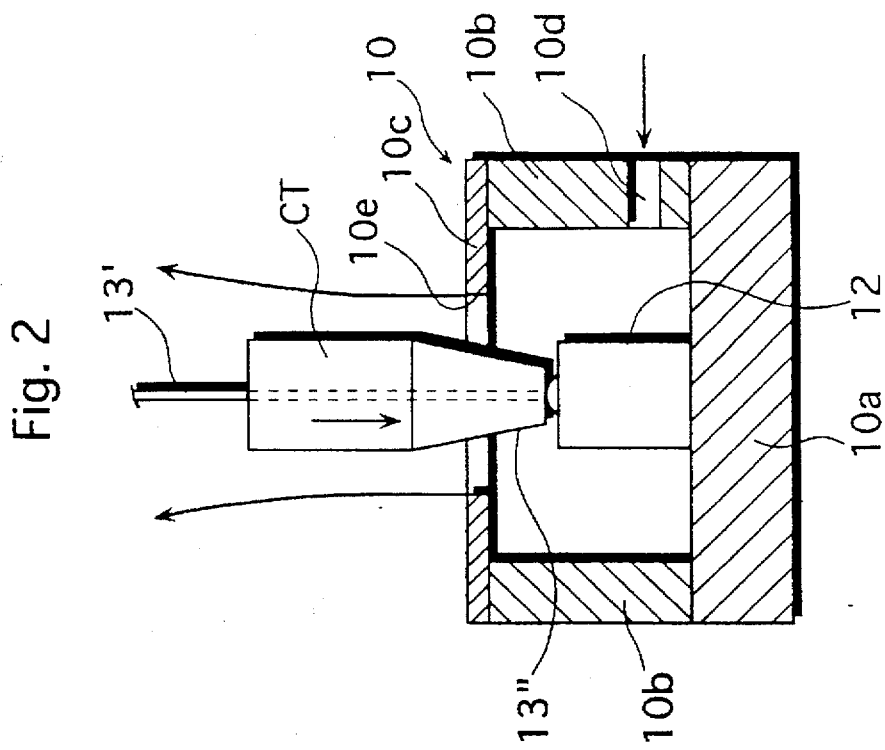

As shown in FIG. 1, the chip 12 is placed in a box 10 whose interior space may serve as a tunnel for transferring the chip 12. The box 10 includes a bottom wall 10a working as a heater block on which the chip 12 is supported. The box 10 further includes a pair of side walls 10b and a top lid wall 10c. One of the side walls 10b is formed with an inlet port 10d for introducing an oxygen-free gas, whereas the lid wall 10c is formed with an upwardly directed outlet opening 10e. Thus, an upward stream of oxygen-free gas is continuously formed or discharged through the outlet opening 10e above the box 10, as indicated by arrows.

The oxygen-free gas to be introduced through the inlet port 10d may comprise an inert gas such as argon gas or nitrogen gas. Alternatively, the oxygen-free gas may comprise a reducing gas which is prepared by mixing an inert gas with up to 5% of hydrogen gas for example.

As also shown in FIG. 1, a capillary tool CT and a spark torch ST are arranged above the box 10. The capillary tool CT is designed to move vertically up and down within the upward stream of oxygen-free gas. The spark torch ST is designed to move laterally into and out of the oxygen-free gas stream.

The capillary tool CT holds an anode wire material 13' extending therethrough and having a lower end 13". The wire material 13' may be selected from the group consisting, for example, of tantalum wire, niobium wire, aluminum wire and copper wire coated with aluminum. Before passing the wire material 13' through the capillary tool CT, the wire material 13' may be preliminarily subjected to a reducing treatment wherein the wire material 13' is heated in a reducing furnace which contains a reducing gas. Such a pretreatment serves to remove an oxide coating of the wire material 13' for better attachment to the chip 12.

For attaching the wire material 13' to the chip 12, the spark torch ST is first advanced laterally into the oxygen-free gas stream, as shown in FIG. 1. In this condition, a voltage is applied across the spark torch ST and the capillary tool CT to form electrical sparks between the spark torch ST and the lower end 13" of the wire material 13'. As a result, the lower end 13" of the wire material 13' is melted in a ball, as also shown in FIG. 1. The spark torch ST is retreated out of the oxygen-free gas stream after forming the lower ball end 13".

Figure 2:
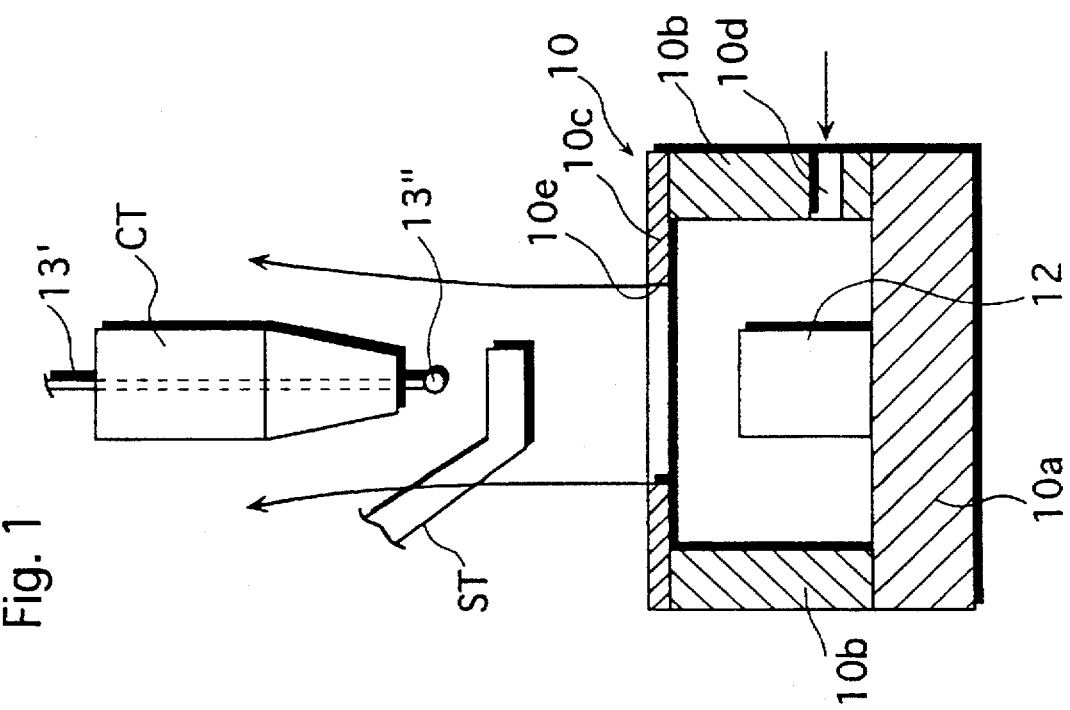

Then, as shown in FIG. 2, the capillary tool CT is lowered toward the chip 12 for pressing the lower ball end 13" longitudinally of the wire material 13' against the chip 12. As a result, the lower ball end 13" of the wire material 13' is compressed into a nail head form for attachment to the chip 12.

Figure 3:
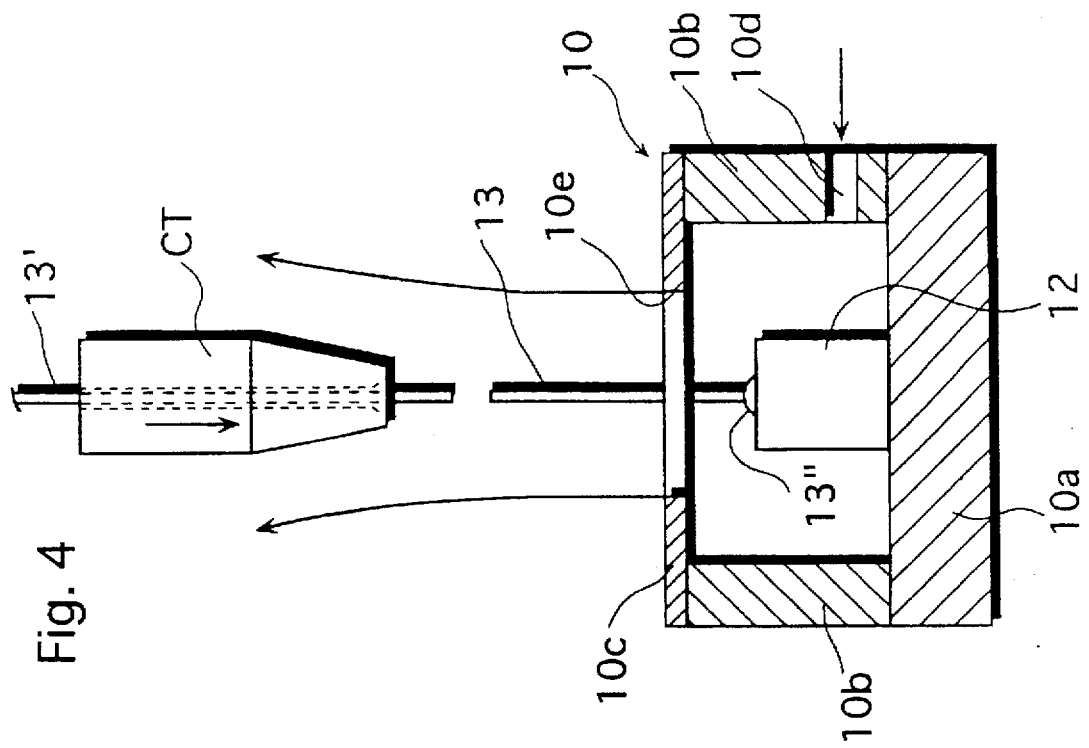

Then, as shown in FIG. 3, the capillary tool CT is raised while paying out the wire material 13'.

Then, as also shown in FIG. 3, the wire material 13' is cut slightly below the capillary tool CT by a shearing cutting SC.

Figure 4:
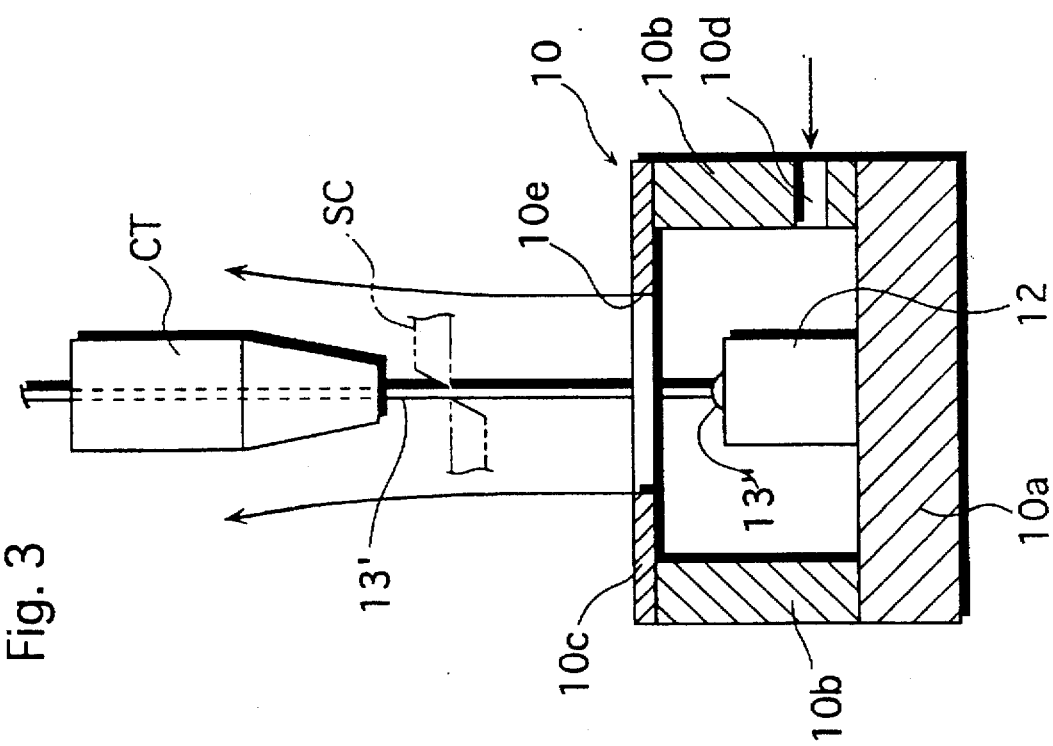
Figure 10:
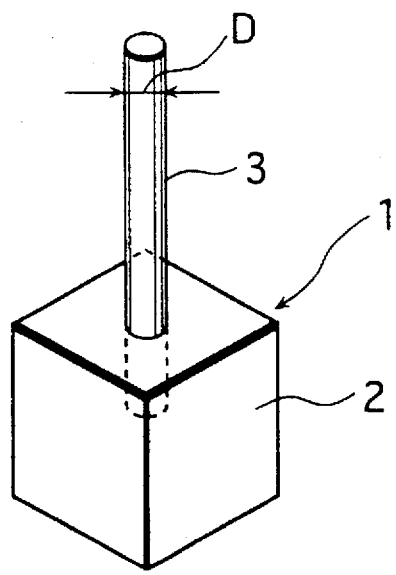
FIG. 10 is a perspective view showing a prior art capacitor element.
Figure 11:
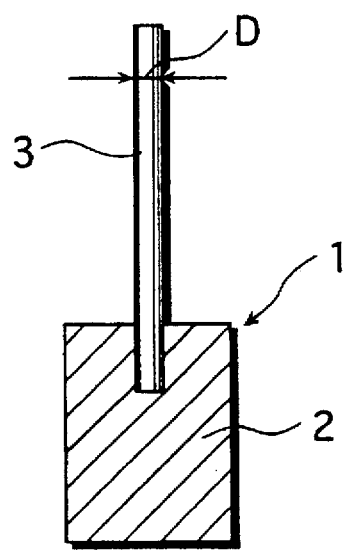
FIG. 11 is a sectional view showing the same prior art capacitor element.
Figure 12:
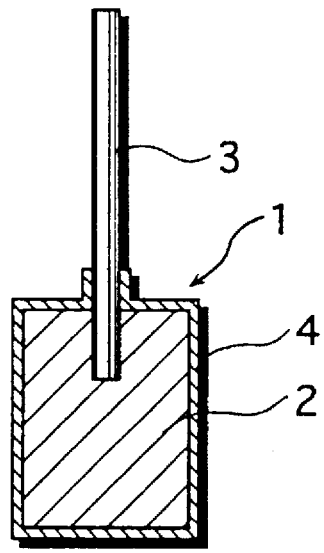
FIG. 12 is a sectional view showing the same prior art capacitor element which has undergone a process step of forming a dielectric layer.
Figure 13:
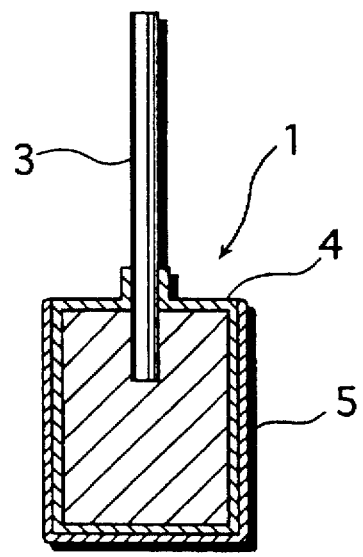
FIG. 13 is a sectional view showing the same prior art capacitor element which has undergone a process step of forming a solid electrolyte layer.
Figure 14:
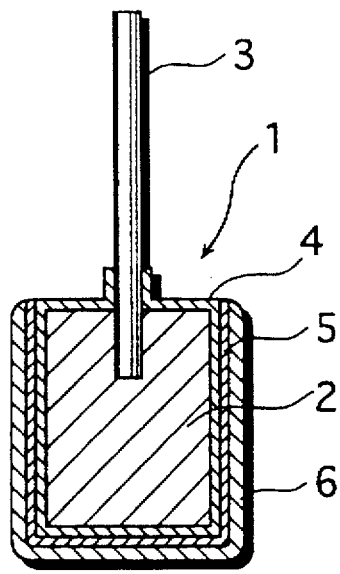
FIG. 14 is a sectional view showing the same prior art capacitor element which has undergone a process step of forming a cathode electrode.
Figure 15:
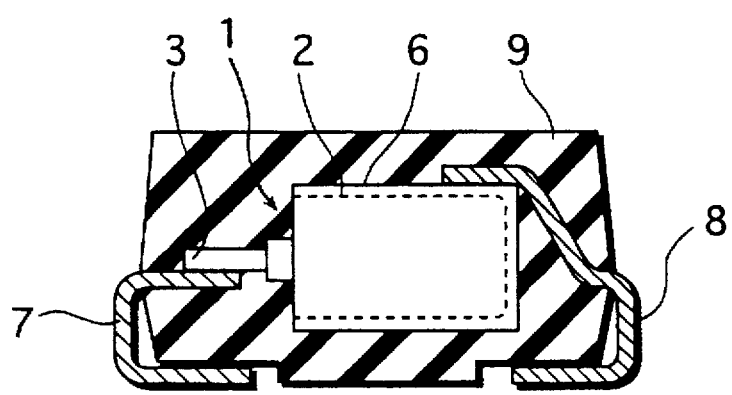
FIG. 15 is a sectional view showing a packaged solid electrolytic capacitor which incorporates the same prior art capacitor element made by the process steps shown in FIGS. 12 through 14.

Finally, as shown in FIG. 4, the capillary tool CT is raised additionally to separate the wire material 13' from the cut segment wire 13 which is attached to the chip 12. The cut segment wire 13 serves as an anode wire for the chip 12.

The above process steps may be repeated by removing the wired chip 12 from the box 10 and introducing a new chip into the box 10, as shown in FIG. 5.

In this way, a capacitor element 11 which includes the chip 12 and the anode wire 13 attached thereto is obtained, as shown in FIG. 6. As clearly appreciated in FIG. 6, the lower nail head end 13" provides a mechanically strong root portion and a greatly increased area for firm attachment to the chip 12 while enabling to reduce the diameter D of the wire 13 itself. Apparently, the reduction of the diameter D of the wire 13 leads to material saving, thereby lowering the production cost. Further, since the anode wire 13 is not inserted into the chip 12 (as opposed to the prior art shown in FIGS. 10 through 14), it is unnecessary to increase the overall volume of the chip 12 for increasing the effective volume of the chip 12, thereby contributing to a size reduction and a capacitance increase of the capacitor.

As shown in FIG. 6, a laser beam from a laser device LD may be directed toward the nail head end 13" of the anode wire 13 after compressively attaching the wire 13 to the chip 12. This will additionally strengthen the attachment or connection between the chip 12 and the anode wire 13.

According to the process steps shown in FIGS. 1 and 2, the formation of the lower ball end 13" of the wire material 13' and the subsequent compressive attachment of the ball end 13" to the chip 12 are equally performed in the oxygen-free gas stream.

Thus, it is possible to prevent the formation of an oxide layer on the lower ball or nail head end 13" of the wire material 13', thereby facilitating reliable and strong attachment to the chip 12. Further, as previously described, if the wire material 13' is subjected to a reducing pretreatment before supplying to the capillary tool CT, the attachment of the wire material 13' to the chip 12 is additionally improved.

The capacitor element 11 (FIG. 6) thus obtained may be further treated in the conventional manner. Specifically, the capacitor element 11 is first heated at a high temperature of 1,200°–1,500° C. for sintering the chip 11 (compacted mass of metal powder). Then, the chip 12 of the capacitor element 11 is subjected to anodic oxidation for forming a dielectric layer of e.g. tantalum pentoxide. Then, the chip 12 is subjected to chemical treatment for forming a solid electrolyte layer of e.g. manganese dioxide. Finally, the chip 12 is graphitized and metalized to form a cathode electrode.

According to the embodiment shown in FIGS. 1 through 5, the attachment of the wire material 13' to the chip 12 is performed before the chip 12 is sintered. However, the wire material 13' may be attached the chip 12 after sintering the chip 12.

Further, the chip 12 may be subjected to a reducing pretreatment for removal of oxide coating before attaching the wire material 13'. Such a pretreatment will additionally improve the reliability and strength of attachment between the chip 12 and the wire material 13'. The reducing pretreatment of the chip 12 may be performed by heating the chip 12 to a temperature of about 400° C. in a reducing gas atmosphere. Of course, if the oxygen-free gas supplied to the box 10 is a reducing gas, the reducing pretreatment of the chip 12 may be performed in the box 10 whose bottom wall or heater block 10a is used for heating purposes, and the chip 12 may be transferred within the tunnel of the box 10 while performing the reducing pretreatment.

FIGS. 7 and 8 illustrate a modified capillary tool CT' which can be advantageously used for attachment of the wire material 13' to the chip 12. The modified capillary tool CT' has a diametrically smaller wire passage portion E1 and a diametrically larger wire passage end portion E2. The diameter D1 of the wire passage end portion E2 may be slightly smaller than the diameter of the ball at the ball end 13" of the wire material 13'.

Using the modified capillary tool CT', the lower ball end 13" is deformed into a nail head 13" having a transitional portion 13a" which is diametrically smaller than the maximum diameter of the nail head 13" but larger than the diameter of the material wire 13', as shown in FIG. 8. The transitional portion 13a" of the nail head 13" is diametrically constant for a predetermined length. Apparently, the transitional portion 13a" increases the mechanical strength of the nail head or root portion of the wire material 13'.

According to the embodiment shown in FIGS. 1 through 5, the lower end 13" of the wire material 13' is formed into a ball by utilizing electrical sparks generated between the spark torch ST and the material wire 13'. However, as shown in FIG. 9, use may be made of a laser device which generates a laser beam for melting the lower end of the wire material 13' into a ball. Alternatively, a high temperature gas flame may be formed to melt the lower end of the wire material 13' into a ball.

The preferred embodiments of the present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

We claim:

1. A capacitor element for a solid electrolytic capacitor comprising:

a chip which is a compacted naked mass of metal powder; and an anode wire projecting from the chip;

wherein the anode wire has a nail head end compressively formed for direct attachment to a surface of the naked mass of metal powder without using any intervening layer, the anode wire and the nail head end being entirely made of a single metal material, and wherein the nail head end of the anode wire is formed by compressing a ball end of the anode wire.

2. The capacitor element according to claim 1, wherein the anode wire further has a transitional portion adjoining the nail head end, the transitional portion having a diameter which is smaller than a maximum diameter of the nail head end but larger than a normal diameter of the anode wire.

3. A capacitor element for a solid electrolytic capacitor comprising:

a chip which is a compacted naked mass of metal powder; and an anode wire having one end attached to the chip;

wherein said one end of the anode wire includes a nail head for direct attachment to a surface of the naked mass of metal powder without using any intervening layer, and a transitional portion of a constant diameter adjoining the nail head, said constant diameter of the transitional portion being smaller than a maximum diameter of the nail head but larger than a normal diameter of the anode wire, the anode wire, the nail head and the transitional portion being entirely made of a single metal material, and wherein the nail head of the anode wire is formed by compressing a ball end of the anode wire.

* * * * *